(12) United States Patent
Wada et al.

(10) Patent No.: US 7,402,968 B2
(45) Date of Patent: Jul. 22, 2008

(54) FIELD WINDING SYNCHRONOUS GENERATOR-MOTOR

(75) Inventors: Noriyuki Wada, Tokyo (JP); Masato Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 11/559,127

(22) Filed: Nov. 13, 2006

(65) Prior Publication Data
US 2007/0132409 A1    Jun. 14, 2007

(30) Foreign Application Priority Data
Dec. 8, 2005    (JP) ............................. 2005-354703

(51) Int. Cl.
H02P 7/32    (2006.01)
(52) U.S. Cl. ................... 318/146; 318/715; 318/721; 318/722; 701/41
(58) Field of Classification Search ........... 318/140, 318/141, 146, 715, 721, 722, 768, 778, 139, 318/254; 701/41
See application file for complete search history.

(56) References Cited
U.S. PATENT DOCUMENTS
4,381,478 A * 4/1983 Saijo et al. ............. 318/135
6,002,234 A * 12/1999 Ohm et al. .............. 318/729
6,927,551 B2 * 8/2005 Yoshimoto ............. 318/715

FOREIGN PATENT DOCUMENTS
| JP | 05-211796 B2 | 8/1993 |
| JP | 06-153580 A | 5/1994 |
| JP | 11-164580 B2 | 6/1999 |
| JP | 2001-352780 B2 | 12/2001 |

* cited by examiner

Primary Examiner—Paul Ip
(74) Attorney, Agent, or Firm—Sughrue Mion, PLLC

(57) ABSTRACT

A field winding synchronous generator-motor includes: a power conversion section that is connected to an electric rotating machine and operating as a generator-motor, and that controls the electric rotating machine; a compensation amount storage section that stores a compensation capable of improving characteristics of the electric rotating machine from a reference position of a rotor; a positional compensation operation section that makes a compensation operation of positional information from a rotor position and a value of the compensation amount storage section; a conducting phase storage section that stores a conducting phase to each armature winding from the reference position; and a rectangular wave application voltage command section that commands a rectangular wave application voltage to each armature winding with respect to the power conversion section from a value of the positional compensation operation section and a value of the conducting phase storage section.

11 Claims, 11 Drawing Sheets

FIELD WINDING SYNCHRONOUS
GENERATOR-MOTOR

BACKGROUND OF THE INVENTION

1. Field of the Invention

The present invention relates to a field winding synchronous generator-motor having an armature winding and a field winding that is mainly mounted on vehicles, and that operates as an electric motor at start-up of an internal combustion engine, as well as operates also as a generator after starting.

2. Description of the Related Art

Recently, for the purposes of an environmental protection or improvement of fuel efficiency, vehicles equipped with an internal combustion engine and the other power source, for example, a generator-motor, being the so-called hybrid vehicles have been developed and practically used. In such vehicles, an internal combustion engine and the other power source are properly used depending on running conditions. For example, to suppress unnecessary fuel consumption at the time of idling, there is the following technique referred to as idle stop. In this idle stop, the internal combustion engines is stopped in the case of being stopped at traffic signals, and then the internal combustion engines is re-started by means of a generator-motor in the case where the intension of starting of a driver such as ON of an accelerator or OFF of a brake pedal is detected.

In a generator-motor mounted onto such vehicles, since it is mounted in the state of giving and receiving torques with respect to an internal combustion engine, the rotational speed thereof is largely varied due to effects of the accelerator operation of a driver or the friction of the internal combustion engine. Therefore, as a type capable of controlling the induced voltage of a generator-motor with no regard to the engine speed of an internal combustion engine, it is not employed the one in which a permanent magnet is contained in a rotor, but employed a field winding type capable of controlling field currents. Furthermore, in respect of efficiency, a three-phase AC synchronous generator-motor is employed.

In this regard, when using a generator-motor as an electric motor, an electric power is supplied to the generator-motor via a power converter functioning to convert DC from a batter mounted on vehicles to AC. However, in the case where an induced voltage that the generator-motor generates is higher than the voltage of a battery, any electric power cannot be supplied to the generator-motor. In general, an induced voltage is proportional to a rotational speed, the number of armature windings and a main magnetic flux. Whereas, since a battery to be mounted on vehicles has drooping characteristics, when current is started to carry to the generator-motor, the inter-terminal voltage of a battery drops substantially in proportion to the amount of current to carry.

Thus, as a method of efficiently utilizing the voltage of a battery having these drooping characteristics, it has been proposed a method of targeting the reduction of switching loss or the improvement in voltage utilization rate by decreasing the number of times of switching of a dc/ac converter, that is, a method of applying rectangular waves having an arbitrary conducting width. Since, however, merely the width of voltage to be applied is controlled, a disadvantage exists in that current cannot be controlled with accuracy. In addition, to control current with accuracy, there is a known technique of making PWM (Pulse Width Modulation) switching of a part of pulse of rectangular waves. However, e.g., a rectifier capacitor is needed in order to make switching, and thus a disadvantage exits in that lower costs and downsizing cannot be achieved.

Also in the past, although there have been proposed many inventions related to a rectangular wave conduction targeting a DC brushless motor, a device for detecting an induced voltage and/or a device for detecting current flowing through an armature is essentially required, thus to be unsuitable for lower costs and downsizing. Moreover, since generally a DC brushless motor is equipped with a permanent magnet at a rotor, an induced voltage to be generated comes to be substantially constant on the conditions of a constant rotational speed. Further, similar techniques are disclosed in the Japanese Patent No. 3183356, the Japanese Patent No. 3333442, the Japanese Patent No. 3574046, and the Japanese Patent Publication (unexamined) No. 153580/1994.

However, in the case of being mounted in the state capable of giving and receiving torques mainly with respect to an internal combustion engine of vehicles as a generator-motor according to the invention, since the rotational speed is largely varied as described above, the induced voltage is largely varied as well, leading to a problem of impaired controllability.

SUMMARY OF THE INVENTION

The present invention was made to solve such problems, and has an object of providing a field winding synchronous generator-motor which is capable of controlling a main magnetic flux with a field winding, and of which characteristics can be improved without causing cost increase as to the control of commanding a rectangular wave voltage applied to the field winding synchronous generator-motor capable of controlling an induced voltage.

A field winding synchronous generator-motor according to the invention comprises: an electric rotating machine that includes an armature winding and a field winding, and operates as a generator-motor; a power conversion section that is connected to the mentioned electric rotating machine, and has a function to control the mentioned electric rotating machine; positional detecting means for detecting a rotor position of the mentioned electric rotating machine; a compensation amount storage section that stores a compensation amount capable of improving characteristics of the mentioned electric rotating machine from a reference position of a rotor of the mentioned electric rotating machine; a positional compensation operation section that makes a compensation operation of positional information from a value of the mentioned positional detecting means and a value of the mentioned compensation amount storage section; a conducting phase storage section that stores a conducting phase to each armature winding of the mentioned electric rotating machine from the reference position of the mentioned electric rotating machine; and a rectangular wave application voltage command section that commands a rectangular wave application voltage to each armature winding of the mentioned electric rotating machine with respect to the mentioned power conversion section from a value of the mentioned positional compensation operation section and a value of the mentioned conducting phase storage section; and in which characteristics of the mentioned electric rotating machine are improved.

According to the field winding synchronous generator-motor of the invention, it is possible to shorten an operation time period by having a compensation amount storage section in which compensation amounts from a reference position of a rotor are stored, it is possible to complement characteristics of an electric rotating machine varied in a nonlinear manner with values of the compensation amount storage section, and thus it is possible to improve the entire characteristics of the field winding synchronous generator-motor. Furthermore, in this field winding synchronous generator-motor according to the invention, no armature current detecting means is required.

The foregoing and other objects, features, aspects and advantages of the present invention will become more apparent from the following detailed description of the present invention when taken in conjunction with the accompanying drawings.

DETAILED DESCRIPTION OF THE INVENTION

Several preferred embodiments according to the present invention are described.

Embodiment 1

Figure 1:
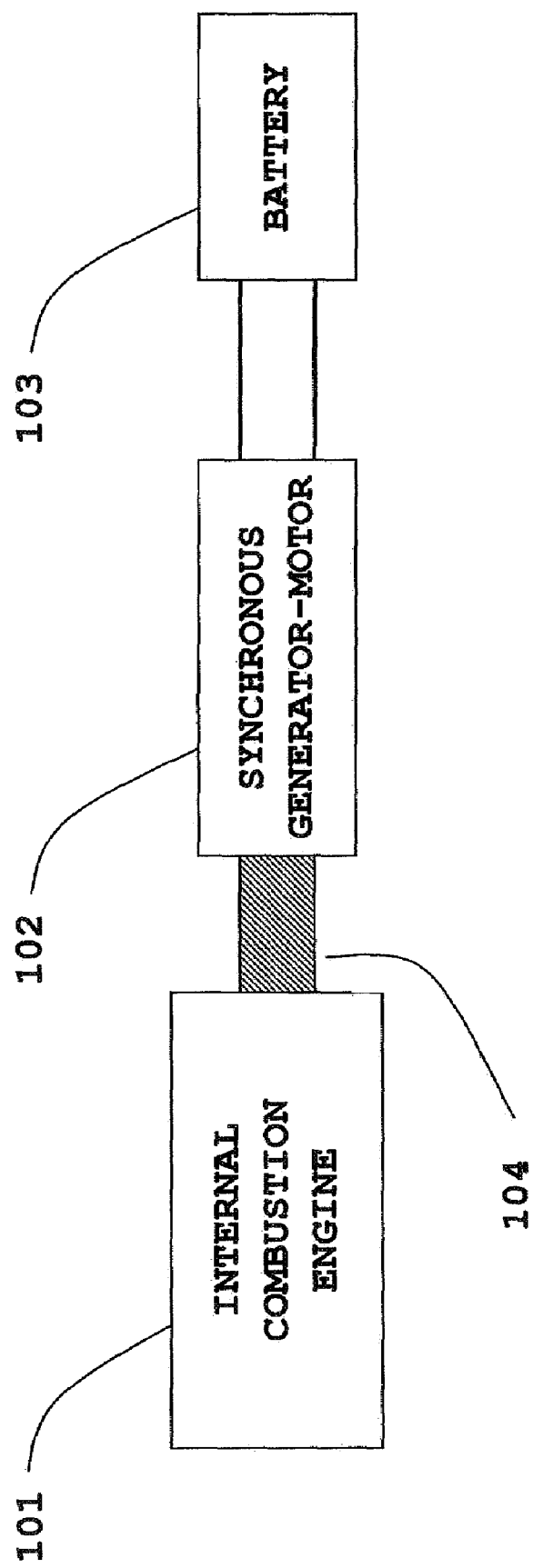
FIG. 1 is a schematic diagram of connection when a field winding synchronous generator-motor according to a first preferred embodiment of the present invention is applied to a vehicle.

FIG. 1 is a schematic diagram of connection when a field winding synchronous generator-motor, being a first embodiment according to the invention, is applied to a vehicle. In the drawing, an internal combustion engine 101, for example, gasoline engine or diesel engine acting as a driving source and a field winding synchronous generator-motor 102 are located in the state capable of giving and receiving torques with each other with directly coupled or via connection means 104 such as belt and pulley. Furthermore, the field winding synchronous generator-motor 102 is electrically connected to a battery 103. It is preferable that this battery 103 is a battery also used by other vehicle loads or a dedicated battery for the field winding synchronous generator-motor.

Figure 2:
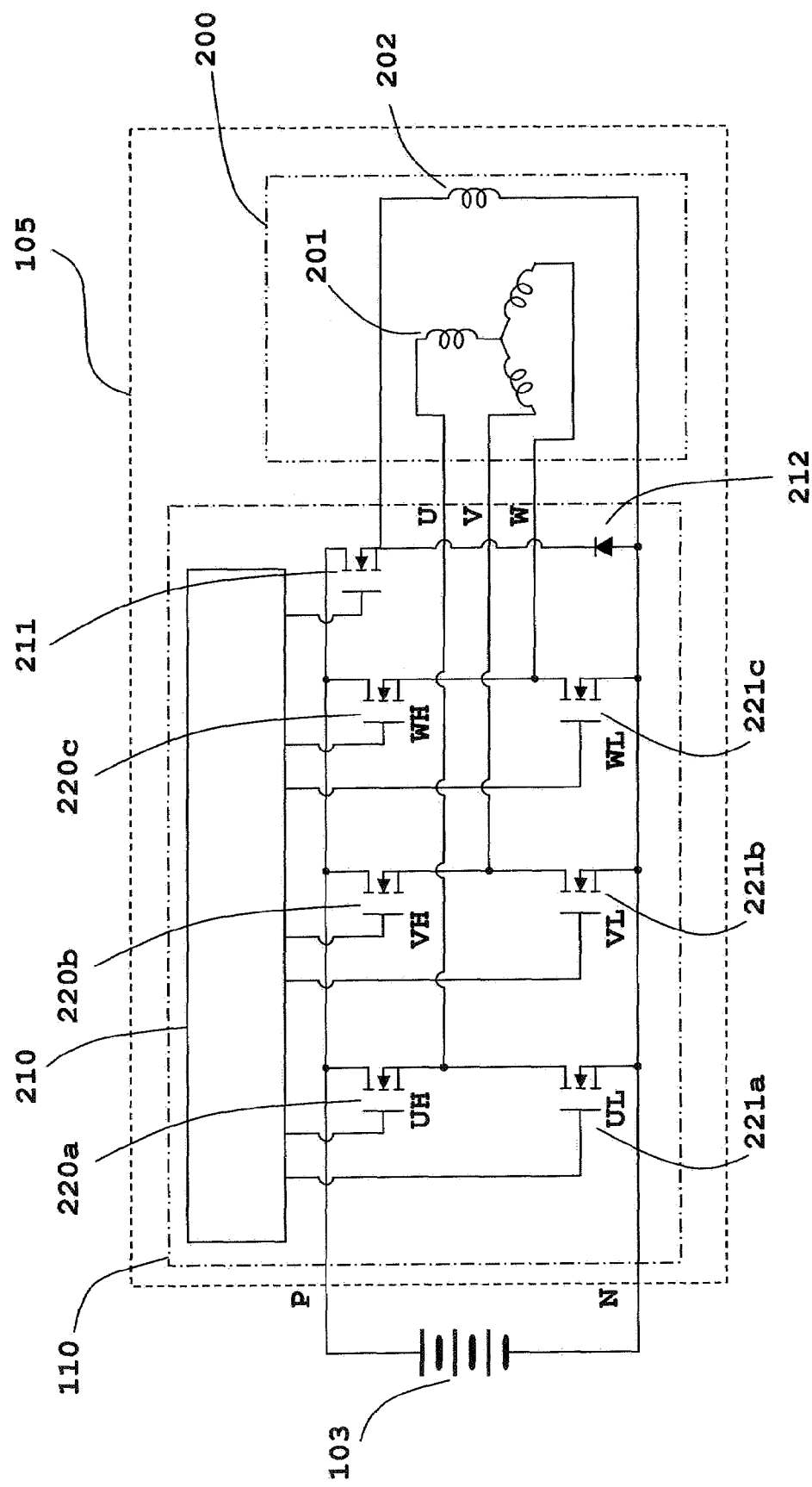
FIG. 2 is a block diagram showing an integral unit of an electric rotating machine and a power conversion section in the field winding synchronous generator-motor according to the first embodiment.

FIG. 2 is a block diagram showing an electric rotating machine body 105 provided with a power conversion section in which an electric rotating machine and a power conversion section in the field winding synchronous generator-motor according to the first embodiment form an integral unit. As shown in FIG. 2, the electric rotating machine body 105 provided with a power conversion section is constructed of an electric rotating machine (generator-motor) 200 formed of a three-phase armature winding 201 in Y-connection or Δ-connection (furthermore, it is not limited to three phases, but may be two phases or six phases.) and a field winding 202, and a power conversion section 110 having a control function thereof.

Due to the integration of the electric rotating machine 200 and the power conversion section 110, there are the following advantages. Since wiring between the armature winding 201 or the filed winding 202, the power conversion section 110 is the shortest, thus effects of wiring drop being diminished, and a limited voltage can be effectively used, characteristics are improved. Furthermore, due to that the wiring between an armature winding 201 and a power conversion section 110 is normally made with wires of large diameter, such shortest wiring provides much advantages in view of weight, costs, and reliability.

The power conversion section 110 is the so-called three-phase inverter (furthermore, it is not limited to a three-phase inverter, but may be a two-phase inverter or a six-phase inverter based on the armature winding). This power conversion section 110 is constructed of six power-converting switching elements 220a to 220c and 221a to 221c that are connected to each phase of the armature winding 201 of the electric rotating machine 200; a drive circuit 210 driving these switching elements; a field winding current switching element 211 connected to the field winding 202 of the electric rotating machine 200; and a flywheel diode 212. The battery 103 applies an inter-terminal voltage P-N thereof to a DC terminal of the power conversion section 110. The drive circuit 210 is arranged to drive the switching elements 220a to 220c and 221a to 221c for power conversion, and the field winding current switching element 211, to make controls such as driving and power generation of the electric rotating machine 200.

Figure 3:
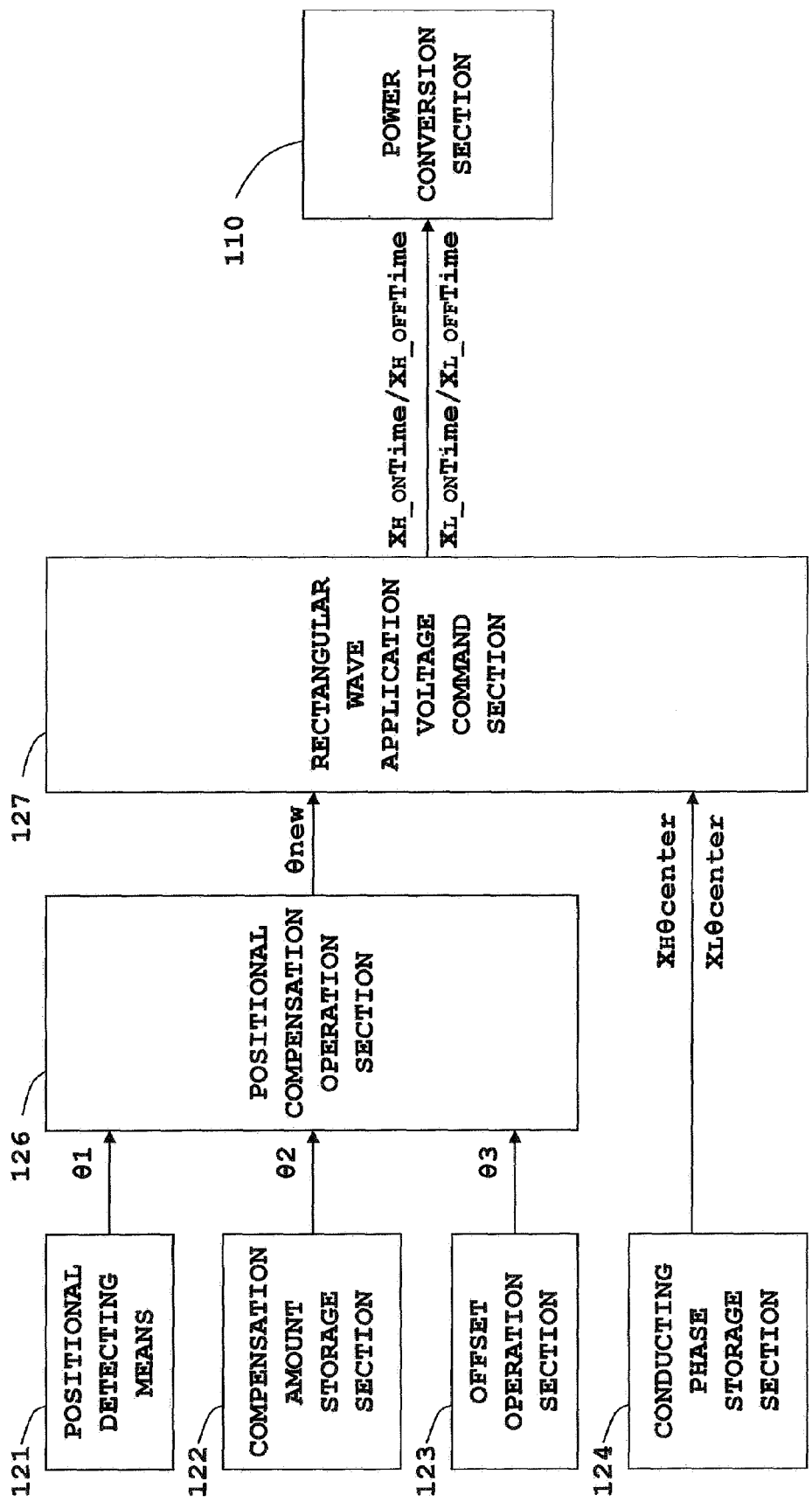
FIG. 3 is a diagram showing a data flow in which ON/OFF commands of each phase of an armature winding are transmitted to the power conversion section according to the first embodiment.
Figure 4:
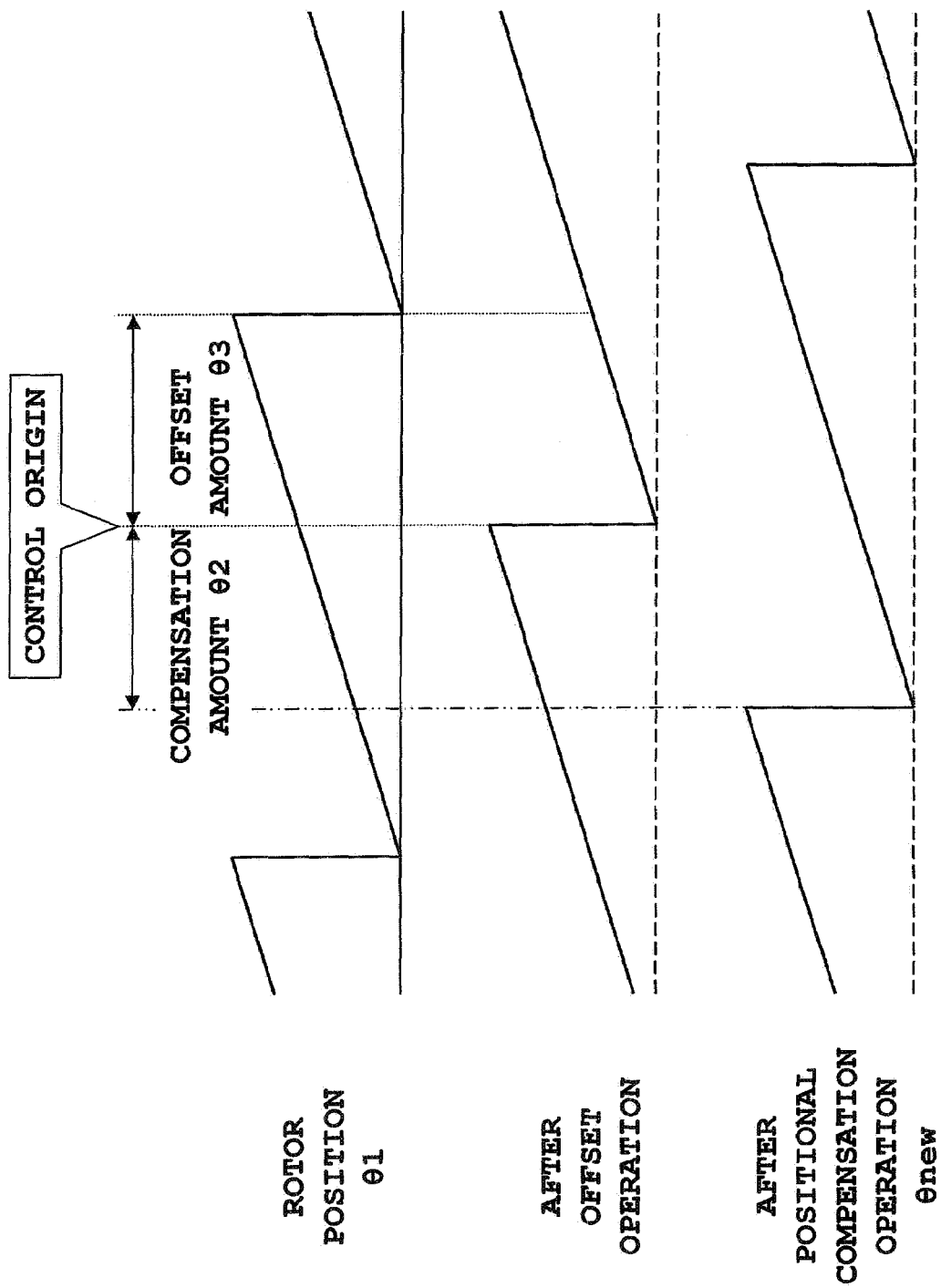
FIG. 4 is a chart explaining an operational method of a positional compensation operation section in the first embodiment.

FIG. 3 relates to the first embodiment, and is a diagram showing a data flow in which ON/OFF commands of each phase of the armature winding are transmitted to the power conversion section. FIG. 4 is a chart showing the operation method of a positional compensation operation section in the first embodiment. Description is now made step by step. First, by means of positional detecting means 121, as shown in an upper chart of FIG. 4, a position $\theta_1$ of a rotor of the electric rotating machine 200 is obtained. Additionally, in upper, middle and lower charts of FIG. 4, the axis of abscissas stands for time, and the axis of ordinates stands for angles. It is preferable that the positional detecting means 121 herein is the one that obtains positional information with sensors such as resolvers, encoders, Hall elements, or any other that estimates positional information from electrical characteristics such as induced voltages. Further, the smaller resolution of positional information is obtained, the more close control is made from the next term.

In addition, as shown in FIG. 2, due to that the power conversion section 110 is integrated with the electric rotating machine 200, in the case of using a sensor as the positional detecting means 121, wiring to the power conversion section 110 becomes the shortest, thus enabling to achieve weight saving, lower costs, and higher reliability. As for positional information of a rotor of the electric rotating machine 200, in the case where a position from the control origin (for example, a zero crossing rise of a U-phase induced voltage) is an absolute position, an offset amount $\theta_3$ of an offset operation sections 123 is to be 0°, and thus no offset is included. On the other hand, in the case where a position from the control origin (for example, a zero crossing rise of a U-phase induced voltage) is a relative position, as shown in the middle chart of FIG. 4, an offset amount of the offset operation sections 123 is to be a dislocation $\theta_3$ from the control origin (for example, in the case where the position 50° dislocated from the zero crossing rise position of a U-phase induced voltage is 0° of $\theta_1$, then $\theta_3$=50°).

Thus, in the former case, operation comes to be easier. In the latter case, when using, e.g., sensors as positional detecting means 121, regardless of accuracy of mounted position or accuracy of machining, accurate positional information can be obtained by including offsets, thus enabling to achieve downsizing and higher reliability at low cost. Furthermore, when a sensor is mounted without making positional alignments in a mounting step, then rotation is externally given, and the offset amount of positions of the sensor being mounted is calculated with induced voltages generated at this time, any step of, e.g., complicated positional alignments in the mounting process become unnecessary, resulting in improvement in productivity. In addition, effects of the dislocation of a sensor can be absorbed by the compensation at the offset operation section 123.

Figure 5:
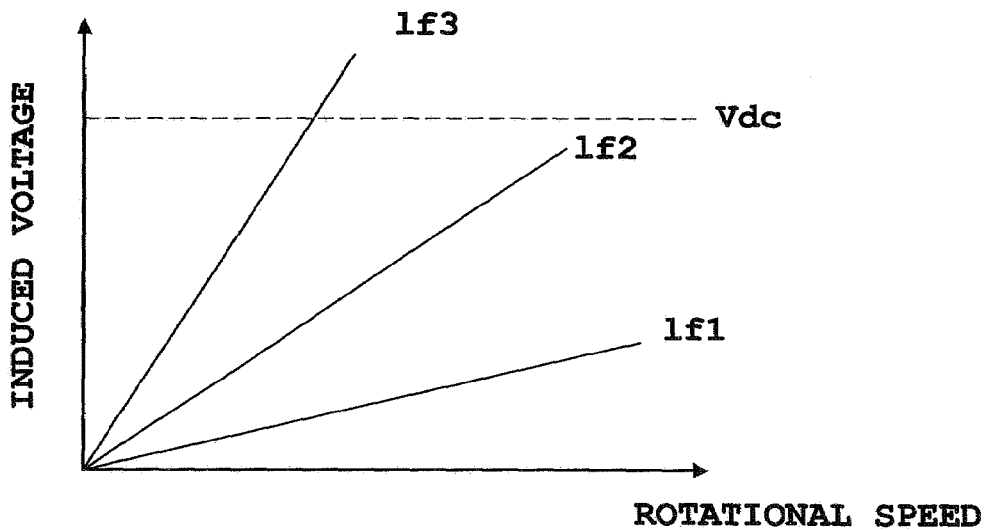
FIG. 5 is a characteristic chart showing characteristics of an induced voltage of the field winding synchronous generator-motor.
Figure 6:
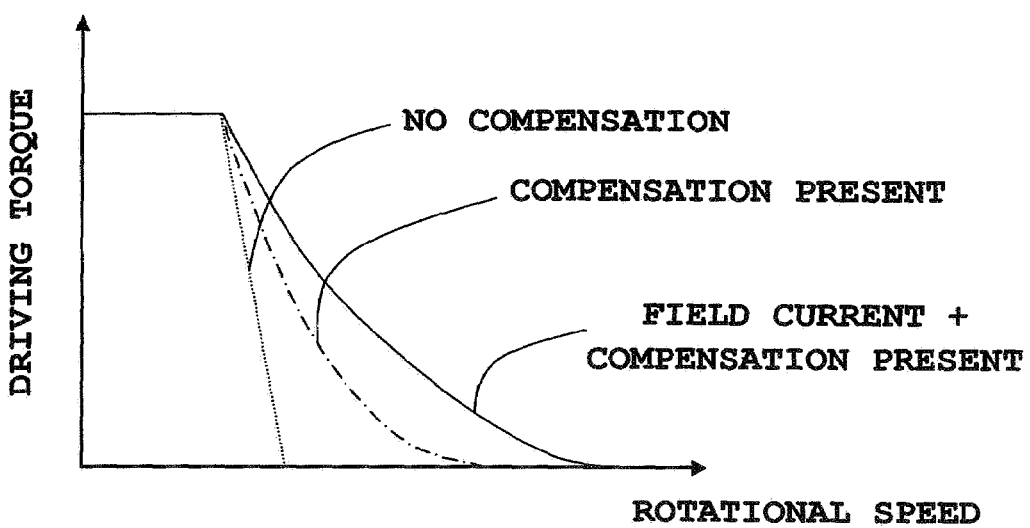
FIG. 6 is a characteristic chart showing characteristics of a driving torque of the field winding synchronous generator-motor.

Now, a compensation amount storage section 122, being an essential part of the invention, is described. In the compensation amount storage section 122, to improve characteristics of an electric rotating machine 200, offset amounts from the control origin as to positions of a rotor are stored. On this principle, descriptions are made with reference to FIGS. 5 and 6. FIG. 5 is a characteristic chart showing induced voltage characteristics of a field winding synchronous generator-motor. Parameters are fielding currents to be carried through the field winding, and there is a relation of If1<If2<If3. For example, when a field current is set to be constant at If3, an induced voltage is increased substantially in proportion as a rotational speed rises. Therefore, when the rotational speed is increased, there will be a relation of "the inter-terminal voltage Vdc of a battery<the induced voltage", and thus no current can be carried through the armature winding of the electric rotating machine. Accordingly, as are "no compensation" characteristics of FIG. 6, the driving torque is sharply decreased from the point of a certain rotational speed. In addition, FIG. 6 is a characteristic chart showing driving torque characteristics of a field winding synchronous generator-motor.

To cope with this, in the case of driving (electric operation), the phase of voltage to be applied to an armature winding is advanced more than the phase of an induced voltage (a current phase is advanced), to be in an optimum current phase, whereby a driving torque can be generated up to higher speed. Accordingly, when the compensation amount is a positive value, characteristics of "compensation present" of FIG. 6 will be exhibited. Further, in the case of using an electric rotating machine as an electric generator, since the above-mentioned compensation is inverted (positive values and negative values are inverted to delay a current phase), it is preferable that different compensation amounts are respectively set at driving and power generation, or the compensation amount at power generation is operated on the basis of the compensation amount at driving. By having different compensation amounts at driving and at power generation, it is possible to obtain optimum characteristics in each mode. Furthermore, when the compensation amount at power generation is operated on the basis of the compensation amount at driving, less memory capacity or less calibration operation is required as compared with the case of having different compensation amounts at driving and at power generation.

Figure 7:
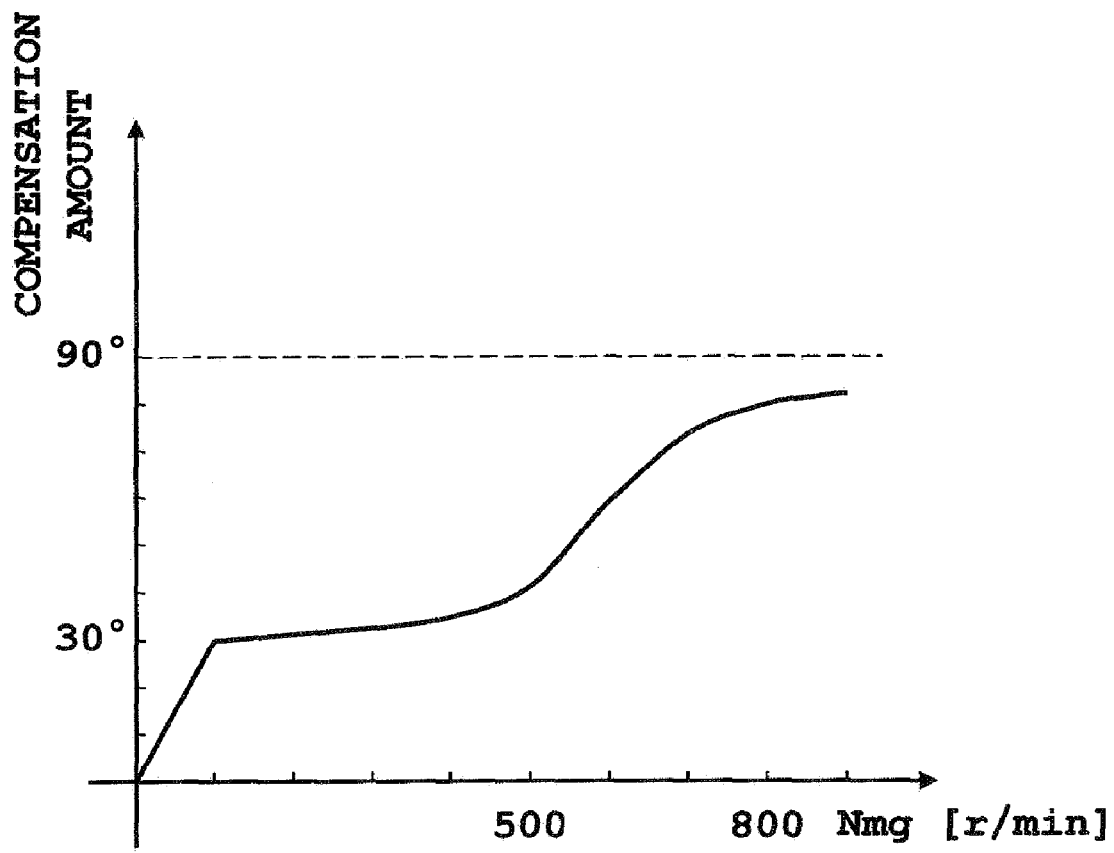
FIG. 7 is a characteristic chart showing one example of optimum compensation amounts of the position of a rotor with respect to rotational speeds.

To make operation of this compensation amount, a compensation amount $\theta_2$ stored in the compensation amount storage section 122 is read, and is inputted to the positional compensation operation section 126. In the positional compensation operation section 126, with a position $\theta_1$ of a rotor (upper chart of FIG. 4) detected by positional detecting means 121 as described above and an offset amount $\theta_3$, positional information after the offset operation shown in a middle chart of FIG. 4 is obtained. With respect to this positional information, a compensation amount $\theta_2$ of the compensation amount storage section 122 is added, to obtain positional information $\theta_{new}$ after the positional compensation operation (shown in a lower chart of FIG. 4) is obtained. In this manner, no particular current detecting means is needed. In addition, also in any electric rotating machine of the same armature winding specification, a driving torque can be generated up to at high speed in the case of driving mode, and power generation can be started from at low speed in the case of power generation mode. FIG. 7 shows the case of driving, and is a characteristic chart showing one example of optimum compensation amounts [deg] of positions of a rotor with respect to rotational speeds Nmg [r/min]. Compensation amounts (offset amounts) are increased as rotational speeds are increased. In this example, a compensation amount $\theta_2$ of the compensation amount storage section 122 is stored to be 30°, whereby positional information $\theta_{new}$ after the positional compensation operation is obtained to be capable of generating a driving torque up to at high speed in the case of driving.

Thereafter, positional information $\theta_{new}$ after the positional compensation operation is inputted to a rectangular wave application voltage command section 127. Inputted also to this rectangular wave application voltage command section 127 are conducting timings $X_H \theta_{center}/X_L \theta_{center}$ at each phase that are stored in an conducting phase storage section 124 {X: U-phase/V-phase/W-phase in the case of three phases electric rotating machine, H: upper arm of the switching elements (220a to 220c), and L: lower arm of the switching elements (221a to 221c)}. These values are to command ON/OFF timings of both arms in each phase with letting the control origin a reference (for example, a zero crossing point of the rise of a U-phase induced voltage). Additionally, $X_H \theta_{center}/X_L \theta_{center}$ stands for a center phase of conducting timings of both of the arms in each phase, and desired conducting widths are set on both sides with these center phases at a center, and ON timings and OFF timings are determined.

Based on these conducting timings $X_H \theta_{center}/X_L \theta_{center}$ and positional information after the positional compensation operation $\theta_{new}$, ON timing timings of both of the arms in each phase $X_{H-ON}$ Time/$X_{L-ON}$ Time and OFF timings of both of the arms in each phase $X_{H-off}$ Time/$X_{L-OFF}$ Time are calculated. That is, in the case of driving, as compared with the normal operation, ON timings of both arms in each phase and OFF timings of both arms in each phases are in leading phases only by a positional information $\theta_{new}$. It is preferable that these timings are timer-outputted using a timer function provided with, e.g., microcomputers, or outputs of these timings are updated every constant period as mere ports. In the latter case, however, it is to be noted that there is a possibility that output update delays occur in a range at high-speed rotation due to output update timing setting (constant period setting). On the other hand, in the case of using a timer function of microcomputers, since even resolutions of a timer can be timer-outputted with accuracy, which is more advantageous.

These ON/OFF timings of both arms in each phase are transmitted to the power conversion section 110. In the power conversion section 110, the switching elements 220a to 220c and 221a to 221c in each phase are driven with a drive circuit 210 based on ON/OFF timings.

Thus, in the case of driving, it is possible to generate driving torques to in higher-speed region than torque characteristics of "no compensation"; and in the case of power generation, on the contrary, it is possible to start power generation from lower rotational speed region, thus making it possible to improve characteristics.

As described above, in the first embodiment, it is possible to shorten an operational time period by having a compensation amount storage section 122, it is possible to complement characteristics of an electric rotating machine changed non-linearly with values of the compensation amount storage section, and it is further possible to improve characteristics of a field winding synchronous generator-motor. Further, supposing that a field current is controlled, a wider operation region can be reliably obtained. Furthermore, no armature current detecting means is required, and it is possible to eliminate the need of detecting means of an induced voltage and a phase voltage. Due to that a rectangular wave current is carried, a small number of switching is made, and it is also possible to eliminate the need of a smoothing capacitor. As a result of the small number of switching, effect due to switching loss is reduced, and thus it is possible to achieve efficiency increase. It is possible to downsize cooling structures as well. Further, by storing a center phase of conduction to each armature winding, it is possible to arbitrarily change the conducting width from the center phase.

Embodiment 2

Figure 8:
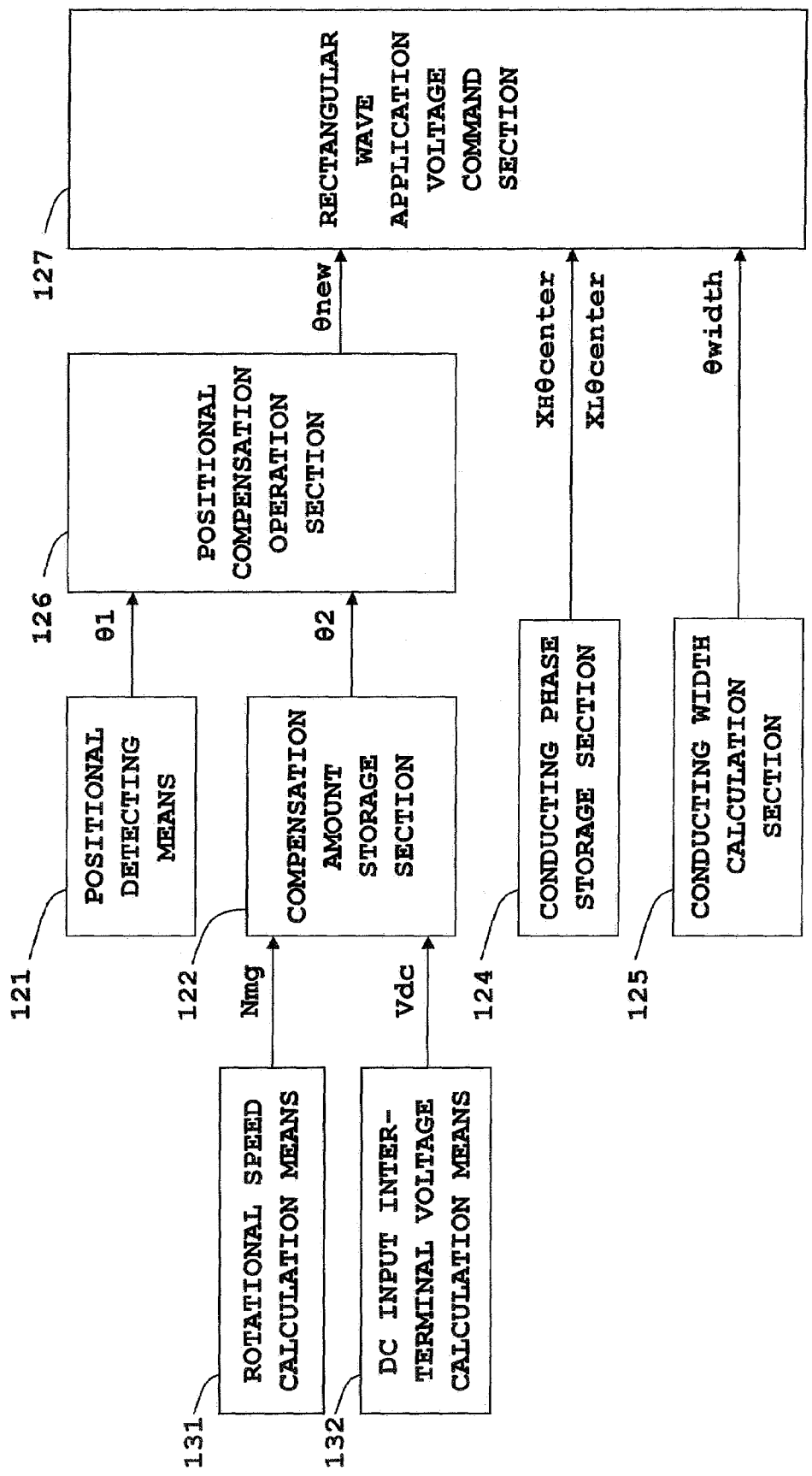
FIG. 8 is a diagram showing a data flow to the generation of ON/FF commands of each phase of an armature winding according to a second embodiment.

FIG. 8 relates to a second embodiment, and is a diagram showing a data flow until generation of ON/OFF commands of each phase of an armature winding. As compared with the case of FIG. 3 of the foregoing first embodiment, in this second embodiment of FIG. 8, inputs to a compensation amount storage section 122 and inputs to a rectangular wave application voltage command section 127 are added. Descriptions will be hereinafter made focusing these points, and as the other points are the same as those in the foregoing first embodiment, further description is omitted herein. With reference to FIG. 8, as inputs to the compensation storage section 122, a rotational speed Nmg from rotational speed calculation means 131 and a DV voltage value Vdc from DC input inter-terminal voltage calculation means 132 are added. First, these additional inputs will be described. In the compensation amount storage section 122, compensation amount for maximizing characteristics of the field winding synchronous generator-motor 102 are stored. Although these compensation amounts may be regularly a constant value as in the foregoing first embodiment, more preferably, it may be changed with rotational speeds or DC voltage values as shown in FIG. 8.

The reason thereof is as follows. Letting an induced voltage of the electric rotating machine E, a transmission line resistance to the electric rotating machine 200 R, an inductance L, an application voltage to the electric rotating machine 200 V, and an angular rotational speed of the electric rotating machine ω, a conducting current I to an armature winding 201 of an electric rotating machine 200 is expressed with the following expression:

$$I=(V-E)/(R+\omega L) \qquad \text{Expression 1}$$

where: I,V, and E stand for vector quantities.

Figure 9:
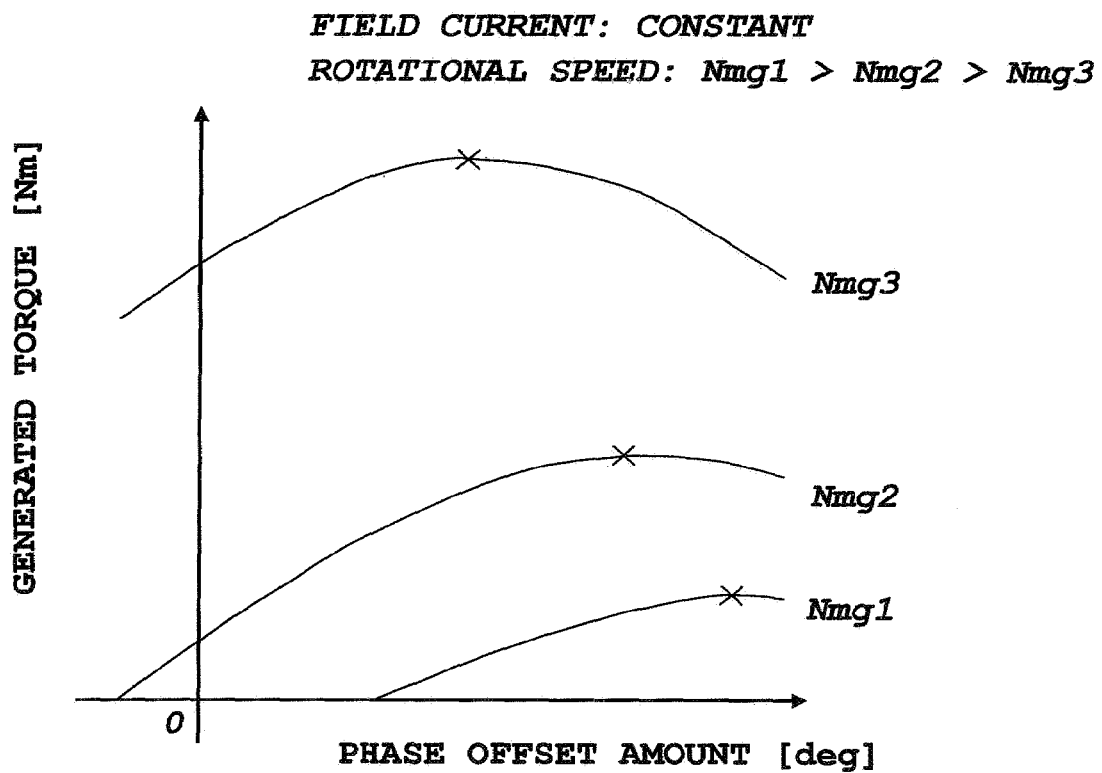
FIG. 9 is a characteristic chart showing a relation between phase compensation amounts (offset amounts) and generated torques when a field current is constant.

From the above Expression 1, since a conducting current I to the armature winding 201 of the electric rotating machine 200 is changed with E, V, R, ω and L, the conducting current I can be controlled with (1) induced voltage E, (2) application voltage V, (3) transmission line resistance R, (4) inductance L, and (5) angular rotational speed ω. The (4) inductance L is a wiring inductance at a power converter and an electric rotating machine, and therebetween in the same manner as is (3) transmission line resistance R, and is varied based on the main magnetic flux or the torque command. Out of the above-mentioned (1) to (5), what are varied based on the rotational speed are (1) induced voltage (FIG. 5), (4) inductance L, and (5) angular rotational speed. Accordingly, to carry current for regularly obtaining optimum characteristics with no regard to the rotational speed, it is preferable that a compensation amount $\theta_2$ is changed with a rotational speeds Nmg. In particular, since the rotational speed is largely varied due to the change of accelerator operation of a driver or the change of friction of an internal combustion engine, by applying the present invention to vehicles while gradually changing the compensation amount $\theta_2$ depending on a rotational speed Nmg, characteristics with respect to the change of these rotational speeds can be largely improved, resulting in much advantages. That is, as shown in FIG. 7, in the case of driving, it is preferable that the compensation amount $\theta_2$ is changed in response to the changing rotational speed Nmg. FIG. 9 is a characteristic chart showing a relation between phase compensation amounts (offset amounts) [deg] and generated torques [Nm] when a constant field current flows.

Letting a rotational speed Nmg parameter, positions of optimum phase offset amounts are indicated by X marks when Nmg1>Nmg2>Nmg3. It is understood from the drawing that as the rotational speed is increased, the optimum phase offset amount is larger.

Figure 10:
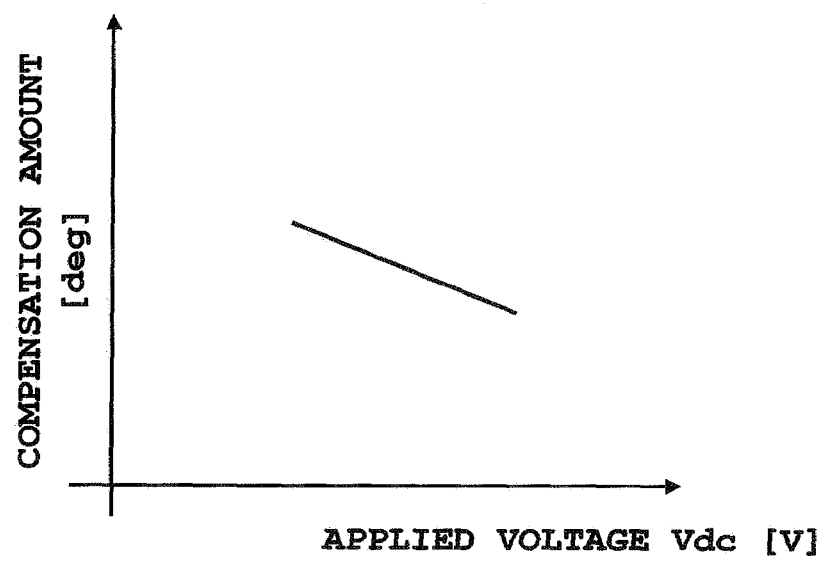
FIG. 10 is a characteristic chart showing a relation between application voltages and compensation amounts of a compensation storage section.

Furthermore, likewise out of the above-mentioned (1) to (5), since what is varied with a DC voltage, that is, a DC input inter-terminal voltage Vdc at a power conversion section (≈inter-terminal voltage of a battery) is (2) application voltage, the compensation amount may be changed with a value thereof. That is, in the case of driving, as shown in FIG. 10, it is preferable that the compensation amount $\theta_2$ is made smaller as the application voltage is increased. Thus, it is preferable that the compensation amount $\theta_2$ is changed step by step in response to the changing rotational speed Nmg and the changing application voltage. Further, it is preferable that the compensation amount $\theta_2$ is changed step by step in response to either the changing rotational speed Nmg or the changing application voltage. In addition, due to that the electric rotating machine 200 and the power conversion section 110 are constructed to be an integral unit, effects of voltage drop on a transmission line come to be smaller, resulting in an advantage of improvement in DC voltage detection accuracy.

Figure 11:
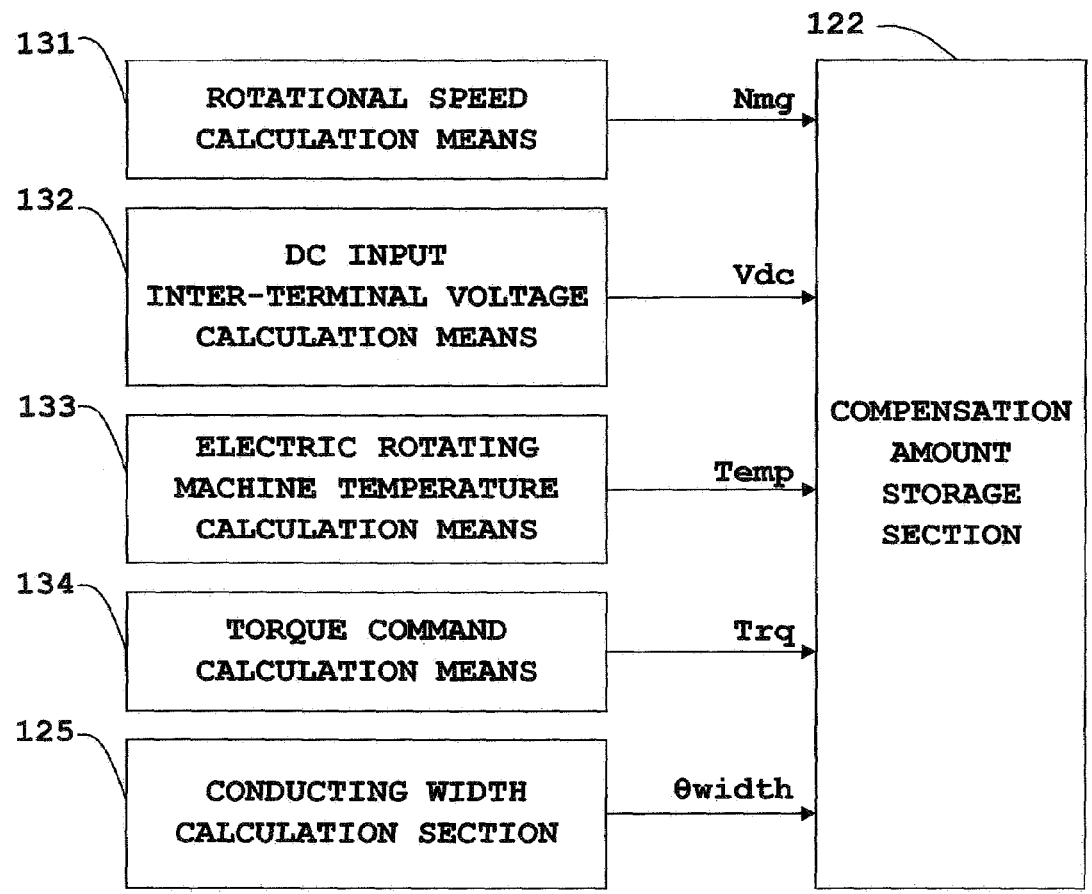
FIG. 11 is a diagram showing another compensation amount storage section according to the second embodiment.

Furthermore, FIG. 11 is a diagram showing another compensation amount storage section 122 according to the second embodiment. As shown in FIG. 11, when the compensation amount $\theta_2$ of the compensation amount storage section 122 is changed further with a temperature Temp from electric rotating machine temperature calculation means 133, a torque command amount Trq from torque command calculation means 134 of the electric rotating machine, and a conducting width $\theta_{width}$ from a conducting width calculation section 125 of a rectangular wave application voltage to an armature winding of the electric rotating machine besides the rotational speed Nmg from rotational speed calculation means 131 and the DC voltage value Vdc from Dc input inter-terminal voltage calculation means 132, then characteristics of the electric rotating machine 200 can be maximized all the more, as well as the scope of application is largely widened.

Compensations are made as follows. Additionally, although five physical quantities are taken as parameters in FIG. 11, these parameters are not always necessary. Only parameters suitable for an application to be used may be selected as appropriately. Out of the above-mentioned (1) to (5), (3) transmission line resistance R is largely varied depending on the temperature Temp of an electric rotating machine 200. Particularly, in the region of low-speed rotation, R in denominator of the expression (1) becomes dominant. In general, a wiring material for use in transmission lines is copper. When the temperature rises by 100° C., the resistance comes to be approximately 1.5 times larger, to be in the same state of decreased Vdc in FIG. 10.

Accordingly, in the case where the invention is applied to vehicles, different currents are carried at driving first in the morning (at atmosphere of 10° C.) and at idle stop starting after having sufficiently run (at atmosphere of 100° C.). To mitigate effects of these temperatures, it is preferable that the compensation amount is changed depending on the temperature of the electric rotating machine 200. That is, in the case of driving, it is preferable that the compensation amount $\theta_2$ is made larger as the temperature of the electric rotating machine 200 is increased. Further, it is preferable that the temperature of the electric rotating machine 200 is directly detected using any thermistor or the like, or in the case where the temperature of the power conversion section 110 is detected, or the present invention is applied to vehicles, it is preferable that the temperature of the electric rotating machine 200 is estimated with the use of a temperature sensor of vehicles. In addition, it is also preferable that the temperature of the electric rotating machine 200 is estimated with operation time period without using any temperature sensor.

Now, advantages of setting a torque command Trq to be a parameter are described. By changing the compensation amount $\theta_2$ with a torque command from the torque command calculation means 134, since not only the maximum torque characteristics but also partial torque characteristics can be obtained at the time of driving, the scope of application as an electric rotating machine comes to be larger. That is, the optimum compensation amount may be selected when the torque command Trq is large, otherwise the optimum compensation amount may be shifted. Furthermore, at power generation, since an electric power generation can be closely controlled by the change of torque commands, it is possible to significantly improve power generation characteristics.

Now, advantages of changing the compensation amount $\theta_2$ with the conducting width $\theta_{width}$ are described. Since (2) application voltage is varied depending on the magnitude of the conducting width $\theta_{width}$, the conducting current I can be controlled. Therefore, to exhibit the maximum characteristics of the electric rotating machine, it is preferable that the compensation amount is changed depending on the conducting width $\theta_{width}$. That is, in the case of driving, it is preferable that the compensation amount $\theta_2$ is made smaller as the conducting width $\theta_{width}$ is increased. Furthermore, owing to the use in combination with the torque command Trq, it becomes possible to control torques more closely.

Furthermore, when using in combination with a DC input voltage, since the conducting current I is decreased by shortening the conducting width $\theta_{width}$ in the case of voltage drop, thus still more voltage drop being impaired, and reliability as a system is improved. Further, since the transmission line resistance becomes smaller at extremely low temperature, there is a possibility of the conducting current I flowing more than previously assumed. To prevent this, in combination with the temperature of the electric rotating machine, the conducting width $\theta_{width}$ is shortened at extremely low temperature, thereby enabling to decrease the conducting current I.

As described above, when the compensation amount $\theta_2$ of the compensation amount storage section 122 is changed by using the rotational speed, DC voltage, temperature of an electric rotating machine, torque command, and conducting width alone or in combination, it is possible to obtain optimum characteristics without being affected by a variety of environmental factors, and thus it is possible to maximize characteristics of the electric rotating machine 200 all the more, as well as to significantly widen the scope of application. Moreover, although the best characteristics can be obtained when taking all the rotational speed, DC voltage, temperature of an electric rotating machine, torque command, and conducting width as parameters, there is a possibility that the very extensive memory capacity is required, or the calibration operation is increased. Thus, it is preferable that desired characteristics and these disadvantages are taken into consideration, and then parameters are determined. Furthermore, although the above-mentioned compensation amounts can be calculated by operation, a problem may exist in the calibration operation of parameters for use in the operation, or in the arithmetic processing time period for making operation on line. However, by having storage means as in this second embodiment, it is possible to shorten the operation time period, and to make control even with a comparatively inexpensive microcomputer.

Now, input values to the rectangular wave application voltage command section 127, being another addition, are described. With reference to FIG. 8, as compared with that described in the foregoing first embodiment, the conducting width $\theta_{width}$ from a conducting width calculation section 125 is added. Thus, in the first embodiment, since any table for making commands of ON/OFF timings in each phase is required, when the conducting width is changed, these tables are required with respect to each conducting width $\theta_{width}$. On the other hand, in this second embodiment, when center phases $X_H \theta_{center}/X_L \theta center$ of the conducting width of both arms in each phase are stored in a conducting phase storage section 124 with letting the control origin a reference, values obtained by adding or subtracting a value of conducting width/2 to or from this center phase stand for ON timings. Therefore, no table for each conducting width is required, thus making it possible to obtain any conducting width easily. In this manner, due to that center phases of conduction to each armature winding are stored, it is possible to arbitrarily alter conducting widths from the center phases.

For example, the center phase of an upper arm in U-phase is stored to be 90°, and the center phase of a lower arm is stored to be 270°. In the case where the conducting width $\theta_{width}$ is commanded to be 180° in such a state, ON timings of the upper arm in U-phase are 90−(180/2)=0° to 90+(180/2)=180°, that is, the interval between 0° and 180° is ON (however, dead-time correction processing is excluded); and ON timings of the lower arm in U-phase are 270−(180/2)=180° to 270+(180/2)=360°, that is, the interval between 180° and 360° is ON timings.

Furthermore, when the conducting width $\theta_{width}$ is 120°, ON timings of the upper arm in U-phase are 90−(120/2)=30° to 90+(120/2)=150°, that is, the upper arm in U-phase is ON in the interval between 30° and 150°. Likewise, the lower arm in U-phase is ON in the interval between 210° (270−120/2) and 330° (270+120/2). These operations are made in the rectangular wave application voltage command section 127. By these operations, no table for each conducting width is required, so that the ROM capacity for these tables can be reduced, and conducting widths can be arbitrarily altered. Consequently, the gradual increase and decrease processing of conducting widths can be easily made, and thus the scope of application as an electric rotating machine comes to be significantly larger.

Embodiment 3

Figure 12:
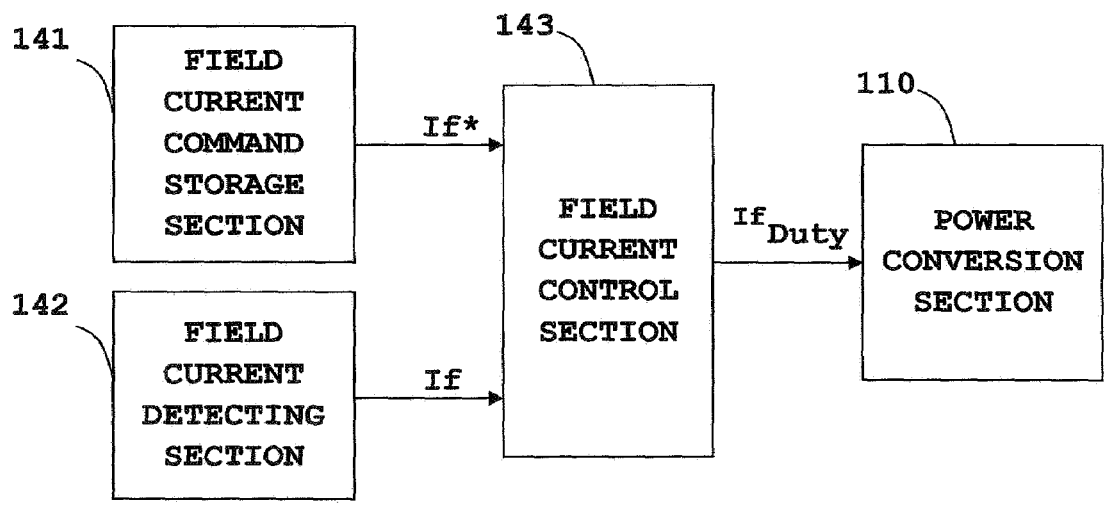
FIG. 12 is a diagram showing a data flow in which field current control commands are transmitted to a power conversion section according to a third embodiment.

Although in the foregoing first and second embodiments, the commands to the field winding 202 of the electric rotating machine 200 are to be constant, in this third embodiment, as shown in FIG. 12, a method for changing field current commands If* of a field current command storage section 141 is described. FIG. 12 relates to the third embodiment, and is a diagram showing a data flow in which filed current control commands are transmitted to the power conversion section. Although there is the method for calculating and computing on line the aforementioned field current commands If*, it becomes a complicated multinomial expression, and therefore the operation takes a long time period. Moreover, to make the complicated multinomial operation at high speed, it is necessary to mount a highly functional microcomputer mounted with DSP (digital signal processor), which is unsuitable for a system intending to be less expensive and smaller-sized.

Figure 13:
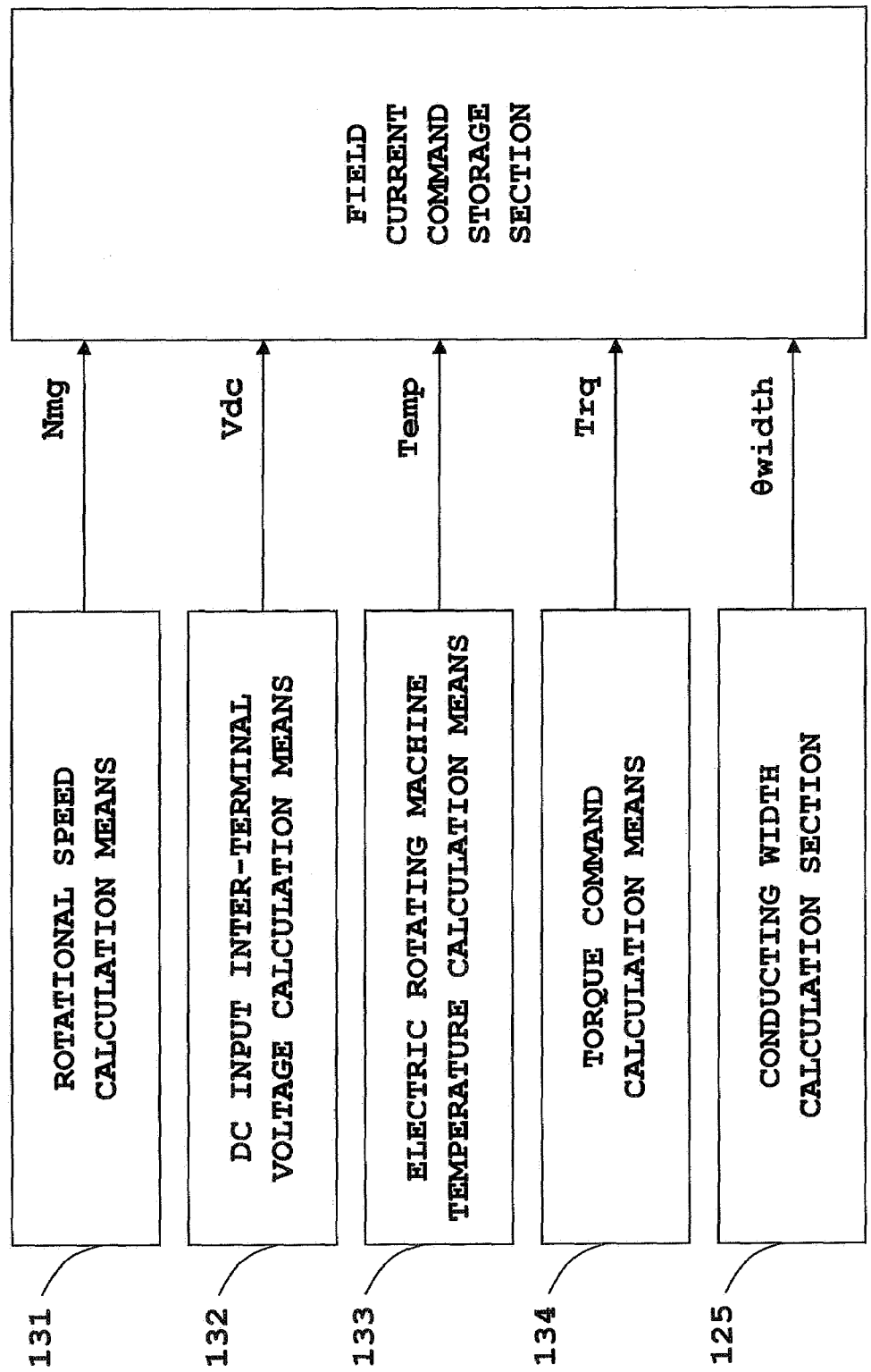
FIG. 13 is a diagram showing a field current command storage section according to the third embodiment.

It is preferable that the field current command If* of the field current command storage section 141, as shown in FIG. 13, is extracted from five physical quantity parameters. FIG. 13 is a diagram showing the field current command storage section 141 according to this third embodiment. In addition, all of these five parameters are not always necessary, but only parameters suitable for applications to be used may be selected as appropriately depending on advantages described below.

The field current command If* is stored in the aforementioned field current command storage section 141. It is preferable that this field current command is the one in which a current value is written, or the one in which a Duty value is written. FIG. 12 shows the field current command in which an actual field current is detected at the field current detecting section 142. It is a matter of course that an accurate control can be made by actually detecting a field current, and making a feedback control with the field current control section 143. However, in respect of configuring an inexpensive and small-sized system, supposing that Duty is stored in the field current command storage section 141 and the so-called open-loop control is made, no actual field current detection of the field current detecting section 142 needs to be particularly made.

Now, the method and advantages of extracting the field current command If* of the field current command storage section 141 depending on the physical quantity are described. The field current is substantially proportional to the main magnetic flux at the electric rotating machine 200, and thus provides large effects on characteristics of the electric rotating machine 200. Therefore, on the supposition that the amount of commands is changed by the following methods, more optimum characteristics can be obtained.

First, the advantage of extracting a rotational speed Nmg as a parameter with respect to a field current is as follows.

In the case of a constant field current, the induced voltage is increased at substantially constant rate as the rotational speed rises. Furthermore, in the case where a relation of $If_1 < If_2 < If_3$ of field currents holds, there will be held a relation of "an induced voltage with $If_1 <$ an induced voltage with $If_2 <$ an induced voltage with $If_3$" in the induced voltages generated at a constant rotational speed (FIG. 5).

Whereas, in the case where an induced voltage an electric rotating machine generates is higher than the voltage of a battery, no electric power comes to be supplied to the generator-motor. Thus, in the case of a constant field current, a driving region cannot be extended to high-speed rotation. However, supposing that measures might be taken not to make the field current constant, and to make the field current smaller as the electric rotating machine operates in higher-speed region, a relation of "the induced voltage<the inter-terminal voltage of a battery (≈DC input inter-terminal voltage of the power conversion section)" will hold to high-speed rotation, thus enabling to extend the driving region. That is, as compared with the case of "compensation present" of FIG. 6, the case of "magnetic field+compensation present" can extend the driving operation region.

Furthermore, in the case of the presence of compensation alone (a constant field current), also at driving, as the electric rotating machine is in higher-speed rotation, to hold a relation of the induced voltage<a battery", it becomes necessary to carry much reactive armature current not contributed to torque, being referred to as a field-weakening current. Consequently, the phenomenon that a driving torque is too small for the amount of armature current is caused, which renders less effective. However, supposing that a smaller field current is made to flow as the electric rotating machine is in higher-speed rotation, the induced voltage comes to be necessarily decreased, so that just a small amount of current for field weakening has to flow, to be highly efficient. For the above-mentioned reasons, it is preferable to change field current commands depending on the rotational speed.

Now, the reasons that the field current is changed depending on the DC input inter-terminal voltage (≈inter-terminal voltage of a battery) of the power conversion section, are described. As described above, in the case of a constant rotational speed, the larger the field current is, the larger the induced voltage is. On the other hand, when the DC input inter-terminal voltage comes to be smaller, the induced voltage level capable of supplying an electric power to the electric rotating machine 200 is decreased. When the DC input inter-terminal voltage is large, on the contrary, the induced voltage level capable of supplying an electric power rises. Therefore, it is preferable that the field current command is made smaller at the time of a small DC input inter-terminal voltage, and on the contrary, the field current command is made larger at the time of a large DC input inter-terminal voltage.

Since the field current has a DC input inter-terminal voltage or an inter-terminal voltage of the battery as a voltage source, when these voltages drop, current capable of flowing as the field current is necessarily decreased (If=V/Rf; If is a field current, V is a DC input inter-terminal voltage, and Rf is a resistance of a field circuitry). Therefore, in systems of making feedback of the field current to make a current control, in the case where field current commands are changed depending on these voltages, no command of current incapable of flowing is made in the case of voltage drop, thus making the stable field current control possible. Furthermore, in the case where a sufficient voltage can be reliably obtained, by making the command of a still larger field current flowing, it is possible to obtain a sufficient main magnetic flux. Thus, it is possible to obtain a large torque at driving, and to obtain a larger electric power generation at power generation.

Whereas, in systems in which Duty commands are stored in the field current command storage section 141, even if Duty is the same, the amount of a field current to carry is varied with the DC input inter-terminal voltage. Therefore, it is significant to change field current commands depending on the DC input inter-terminal voltage. For the above-mentioned reasons, it is preferable to store field current commands with letting the DC input inter-terminal voltage or the inter-terminal voltage of a battery a parameter.

In addition, a field current If, a rotational speed Nmg, and an induced voltage E have a relation as Expression 2:

$$E = K \times Nmg \times If \text{ (K:coefficient)} \qquad \text{Expression 2}$$

Further, since the DC input inter-terminal voltage and the induced voltage E are related to determination on whether or not an electric power can be supplied to an electric rotating machine as described above, it is more preferably that field current commands may be extracted from two parameters of the rotational speed and the DC input inter-terminal voltage.

Now, the reason of taking the temperature Temp of the electric rotating machine as a parameter is described. As mentioned above, Rf is a resistance of a field circuitry, and this value is varied depending on the temperature. Therefore, in systems in which feedback of field currents is made to control currents, the following settings are to be made. In the case of high temperature, to prevent burnout or not to make field current commands incapable of flowing, the field current command is set to be small. On the contrary, in the case of low temperature, since there is no fear of burnout and still more current can be carried, the field current command is set to be large. Consequently, sufficient characteristics can be obtained from at low temperature to at high temperature, as well as high reliability is obtained.

On the other hand, in systems in which Duty commands are stored in the field current command storage section 141, despite the same Duty, the resistance of the field circuitry is varied depending on the temperature of the electric rotating machine 200, and thus the amount of field currents to carry is changed. Therefore, it is preferable that the temperature of the electric rotating machine 200 is set to be a parameter. Furthermore, it is preferable that the temperature of the electric rotating machine 200 is directly detected using a thermistor or the like, or in the case where the temperature of the power conversion section 110 is detected, or the invention is applied to vehicles, it is preferable that the temperature of the electric rotating machine 200 is estimated with the use of a temperature sensor of vehicles. In addition, it is also preferable that the temperature of the electric rotating machine 200 is estimated with operation time periods without using a temperature sensor.

Now, advantages of setting the torque command Trq to be a parameter are described. In general, the torque of the electric rotating machine 200 is proportional to the amount of the main magnetic flux. Since this main magnetic flux can be adjusted with field currents, it is preferable that to change the torque, the field current is changed. Thus, at driving, since not only the maximum torque characteristics but also partial torque characteristics can be efficiently achieved, the scope of application as an electric rotating machine grows larger. Furthermore, at power generation, since the electric power generation can be controlled with field currents, power generation can be controlled closely.

Finally, advantages of changing the field current with the conducting width $\theta_{width}$ are described. For example, when the conducting angle in a three-phase synchronous generator-motor is 180°, either of upper and lower switching elements in each phase are ON, and thus three of six elements are definitely ON (except for during dead time). On the other hand, when the conducting angle is 120°, a state that only two of six elements are ON occurs. At this time, in the case of the state of at high speed as well as much field current flowing, elements that are not ON come to be in the rectified state of diode, and thus there is a possibility of power generation in spite of in the driving state. Therefore, when the conducting width is small, it is possible to prevent an accidental power generation malfunction by making the field current smaller. Furthermore, when field current commands are referred to in combination with a rotational speed Nmg, for the above-mentioned reasons, still larger effects are obtained.

In addition, in this third embodiment, in the case of a generator-motor, field currents are set with letting the main magnetic flux at driving in a short time period when the maximum torque is generated a reference. In general, in the case of functioning as a power generator, the continuous use is a basic assumption. Thus, when the field current at driving is allowed to flow at power generation as it is, the occurrence of burnout may be thought. In case of having separate field current commands If* at driving and at power generation, the occurrence of burnout can be prevented. Further, by having separate field current commands If* at driving and at power generation, optimum characteristics can be efficiently obtained. Furthermore, in the case where both storage regions cannot be secured due to restrictions on the ROM capacity, it is preferable that either of these commands is stored, and this command is compensated with a certain coefficient to be used. For example, there is a method in which only the field current command at driving is stored, and the field current command at power generation is obtained by dividing the field current command at driving by a constant coefficient. In addition, this coefficient is not a constant coefficient, but coefficients may be suitably calculated, for example, with letting five physical quantities described in the third embodiment parameters.

A field current command If* obtained in this way is inputted to a field current control section 143. According to the third embodiment, in the case where the field current command If* is current as a physical quantity, an actual field current If is inputted from a field current detecting section 142, the command value and the actual value are inputted to a control device such as PI control, and the optimum value is calculated by the feedback control. Whereas, in systems in which Duty commands are stored in the field current command storage section 141, since field currents are controlled in an open-loop fashion, no actual field current detection at the field current detecting section 142 is particularly needed. Unless it is fail, for example, short circuit or disconnection in a field circuitry, the Duty command has only to be outputted as it is.

Thereafter, a field Duty command $If_{Duty}$ is transmitted to the power conversion section 110, and the switching elements 211 for field winding current are driven at the drive circuit 210 based on the field Duty command $If_{Duty}$. As described above, due to that the field current commands can be changed, an operation region can be made larger all the more, as well as characteristics of a field winding synchronous generator-motor can be improved, and thus an efficient operation can be achieved. In addition, when having as parameters all the rotational speed of the electric rotating machine, the DC input inter-terminal voltage of the power conversion section or the inter-terminal voltage of the battery, the temperature of the electric rotating machine, the torque command quantity of the electric rotating machine, and the conducting width of the rectangular wave application voltage to the armature winding of the electric rotating machine, it is certain that the best characteristics can be obtained. In that case, however, there is a possibility that the memory capacity is very extensive, or the calibration operation is increased. Consequently, it is preferable that desired characteristics and disadvantages thereof are taken into consideration, and then letting any one or more of them parameters, the command value of the field winding current command storage section is determined and stored stepwise.

Embodiment 4

Figure 14:
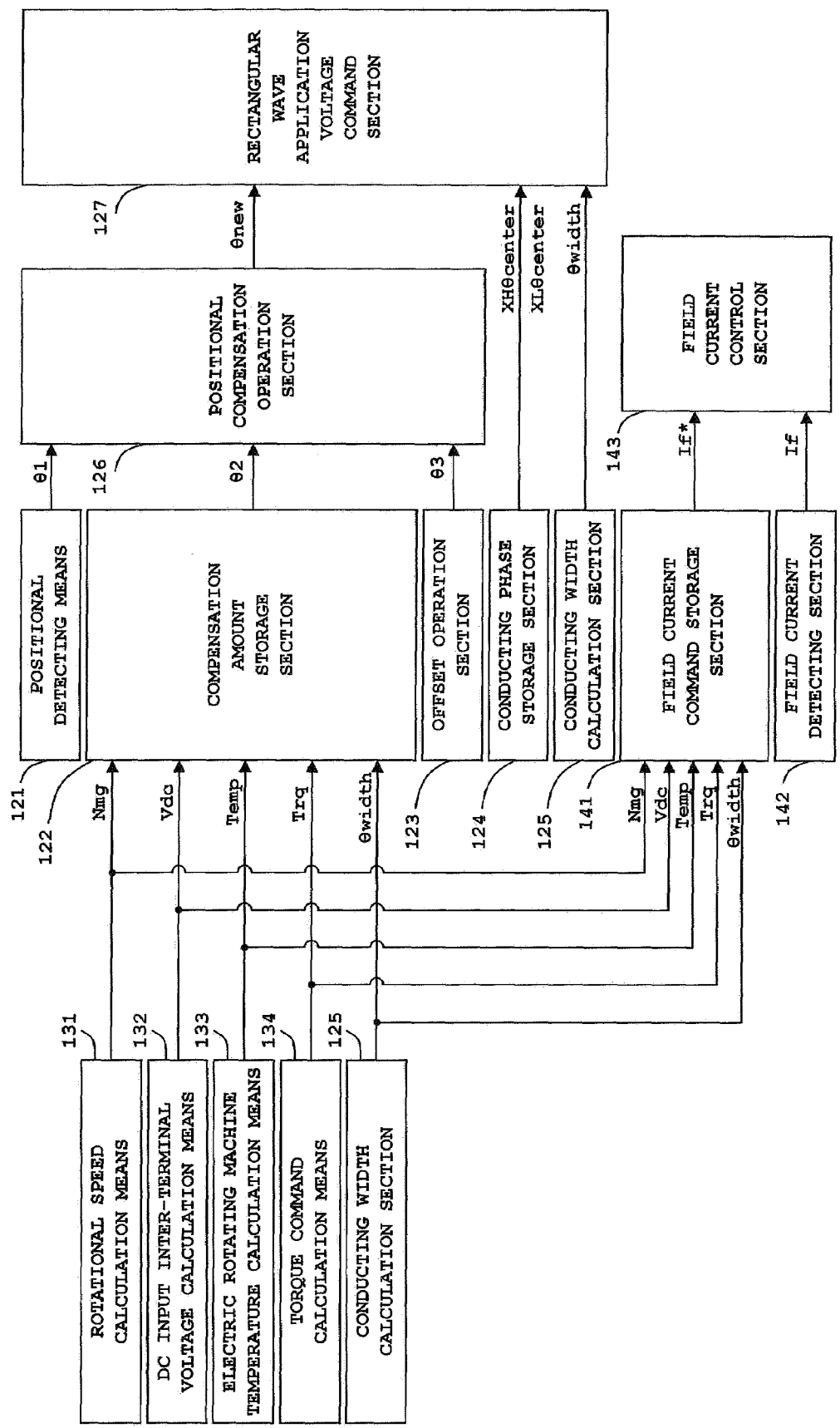
FIG. 14 is a diagram showing a data flow to the generation of ON/OFF commands of each phase of an armature winding and a field winding according to a fourth embodiment.

FIG. 14 relates to a fourth embodiment, and is a diagram showing a data flow to ON/OFF command generation of each phase of an armature winding and a field winding. As seen from FIG. 14, although this fourth embodiment is basically arranged to be an aggregation of functions described in the first to third embodiments, parameters for extracting respective storage values (the amount of compensation, the amount of command) from the compensation amount storage section 122 and the field current command storage section 141 are set to be the same.

That is, letting any one or more of the rotational speed Nmg obtained from the rotational speed calculation means 131, DC voltage Vdc from the DC input inter-terminal voltage calculation means 132, electric rotating machine temperature Temp from the electric rotating machine temperature calculation means 133, torque command Trq from the torque command calculation means 134, and conducting width $\theta_{width}$ from the conducting width calculation section 125 parameters, a compensation amount $\theta_2$ is referred from the compensation amount storage section 122. Furthermore, using the same parameters as the parameters for use in extracting the compensation amount $\theta_2$ from the compensation storage section 122, a field current command If* is referred from the field current command storage section 141.

Advantages of such operations are as follows. In the foregoing second and third embodiments, although the advantages of extracting and determining the compensation amount $\theta_2$ and the field current command If* from respective parameters are described, those advantages are both much related with each other. As one example, since an induced voltage is proportional to a rotational speed and a main magnetic flux, in the case where the operation region is extended to the side of high-speed rotation, not only the compensation amount is changed depending on the rotational speed, but also the field current is commanded to be smaller on the side of high-speed rotation, that is, both the compensation amount and the field current are changed based on the rotational speed, whereby it comes to be possible to extend the operation region and thus to satisfy more optimum characteristics than the case of separately setting the compensation amount $\theta_2$ and field current command If*.

Further, in the case where parameters are used separately with respect to the compensation amount $\theta_2$ and the field current command If*, the parameter calculation means (131 to 134, 125) are separately needed in determination of each of them. However, by using the same parameter calculation means, it is possible to minimize the number of calculation means, and since only one processing is enough for each parameter calculation, it is possible to improve processing speed.

In addition, a method in which the conducting width can be arbitrarily changed with less ROM capacity by storing the center phase of conducting phase of each phase of the armature winding, is described in the foregoing second embodiment. Whereas, characteristic advantages of having field current commands with respect to each of various parameters are described in the third embodiment. In this fourth embodiment, by uniting these functions, it is possible to satisfy optimum characteristics with less ROM capacity.

The reason thereof is that by the method of storing the center phase of conducting phase of each phase of the armature winding, as in the second embodiment, ROM capacity is largely reduced. This reduced ROM capacity is allocated to the field current command storage section 141 or the compensation amount storage section 122, thus making it possible to improve characteristics all the more. That is, it is possible to provide system of the best ratio between characteristics and ROM capacity. Furthermore, since the magnitude of a ROM capacity directly affects costs, it is possible to provide a filed winding synchronous generator-motor of the best balance between characteristics and costs.

While the presently preferred embodiments of the present invention have been shown and described. It is to be understood that these disclosures are for the purpose of illustration and that various changes and modifications may be made without departing from the scope of the invention.

What is claimed is:

1. A field winding synchronous generator-motor comprising:
    an electric rotating machine that includes an armature winding and a field winding, and operates as a generator-motor;
    a power conversion section that is connected to said electric rotating machine, and has a function to control said electric rotating machine;
    positional detecting means for detecting a rotor position of said electric rotating machine;
    a compensation amount storage section that stores a compensation amount capable of improving characteristics of said electric rotating machine from a reference position of a rotor of said electric rotating machine;
    positional compensation operation section that makes a compensation operation of positional information from a value of said positional detecting means and a value of said compensation amount storage section;
    a conducting phase storage section that stores a conducting phase to each armature winding of said electric rotating machine from the reference position of said electric rotating machine; and
    a rectangular wave application voltage command section that commands a rectangular wave application voltage to each armature winding of said electric rotating machine with respect to said power conversion section from a value of said positional compensation operation section and a value of said conducting phase storage section;
    wherein characteristics of said electric rotating machine are improved.

2. The field winding synchronous generator-motor according to claim 1, wherein said conducting phase storage section stores a center phase of a conducting phase to each armature winding of said electric rotating machine from the reference position of said electric rotating machine.

3. The field winding synchronous generator-motor according to claim 1, further comprising a field winding current command storage section storing a command value to a field winding of said electric rotating machine, wherein field current is carried to a field winding based on a command value of said field winding current command storage section.

4. The field winding synchronous generator-motor according to claim 1, wherein said compensation amount storage section stores a compensation amount thereof taking at least one of a rotational speed of said electric rotating machine, a DC input inter-terminal voltage of said power conversion section or an inter-terminal voltage of a battery, a temperature of said electric rotating machine, a torque command amount of said electric rotating machine, and a conducting width of a rectangular wave application voltage to the armature winding of said electric rotating machine as a parameter.

5. The field winding synchronous generator-motor according to claim 3, wherein said field winding current command storage section stores a command value thereof taking at least one of a rotational speed pf said electric rotating machine, a DC input inter-terminal voltage of said power conversion section or an inter-terminal voltage of a battery, a temperature of said electric rotating machine, a torque command amount of said electric rotating machine, and a conducting width of a rectangular wave application voltage to an armature winding of said electric rotating machine as a parameter.

6. The field winding synchronous generator-motor according to claim 5, wherein the parameter to determine the command value of said field winding current command storage section is common with the parameter to determine the compensation amount of said compensation amount storage section.

7. The field winding synchronous generator-motor according to claim 1, wherein the compensation amount of said compensation amount storage section is stored as either a compensation amount at driving said electric rotating machine or a compensation amount at power generation of said electric rotating machine.

8. The field winding synchronous generator-motor according to claim 3, wherein the command value of said field winding current command storage section is stored as either a command value at driving said electric rotating machine or a command value at power generation of said electric rotating machine.

9. The field winding synchronous generator-motor according to claim 1, wherein the compensation amount of said compensation amount storage section is stored separately as a compensation amount at driving said electric rotating machine and a compensation amount at power generation of said electric rotating machine.

10. The field winding synchronous generator-motor according to claim 3, wherein the command value of said field winding current command storage section is stored separately as a command value at driving said electric rotating machine and a command value at power generation of said electric rotating machine.

11. The field winding synchronous generator-motor according to claim 1, wherein said positional compensation operation section is arranged so as to compensate a dislocation with an offset amount that makes offset of a dislocation from the reference position of an induced voltage of said electric rotating machine.

* * * * *